3,175,611
METHOD OF CONSOLIDATING INCOMPETENT SANDS IN OIL BEARING FORMATION
Wayne F. Hower, Duncan, Okla., assignor to Halliburton Company, Duncan, Okla., a corporation of Delaware
No Drawing. Filed Dec. 18, 1962, Ser. No. 245,429
16 Claims. (Cl. 166—29)

This is a continuation-in-part of my copending application Serial No. 29,174 filed May 16, 1960, now abandoned.

This invention relates to a method for consolidating formations, such as sand, and more particularly to a method for consolidating formations penetrated by a well bore of an oil well or the like, while retaining permeability in the consolidated zone.

The existence of severe sanding conditions in an oil or gas producing interval of a well bore may cause many difficulties and add considerably to the cost of operations. Quite often the flow of oil is stopped completely, while in other cases, floating sand damages parts of the production equipment. Rig time, replacement of parts, and loss in oil production are the costly results of these sand troubles.

There are many wells, particularly those in the coastal areas of the United States, that are producing hydrocarbon fluids from incompetent sand formations, where various methods have been used in an effort to control the production of sand. In some of these wells, the use of resins has met with fair success. The main disadvantage in the use of resins is the long shut-in time (12 to 24 hours) required for them to set. Also, frequently, more than one stage of resin is necessary to control the sand.

Screens, liners, gravel packs, and other mechanical means of controlling the sand have all found favor in the oil producing industry. However, these methods do not leave the casing clear for all types of multiple completions and the cure does not last for the production life of the well in some cases. Accordingly, there has been a continuing demand for a more efficient and cheaper method of solving this problem.

Examples of chemical processes which have been used to some extent are found in the U.S. patents to Wrightsman, No. 2,604,172 granted July 22, 1952; Wrightsman et al., No. 2,378,817 granted July 19, 1945; and Simms, No. 2,771,952 granted November 27, 1956.

A primary object of the present invention is to provide a process for consolidating loose sand in an oil or gas producing formation, while maintaining adequate permeability in the consolidated zone to permit flow into the well of the fluid to be produced.

In accordance with one feature of the present invention, it is proposed to consolidate loose sand in an oil producing formation to a considerable extent without destroying the permeability of the formation. The permeability may be reduced, somewhat, but if the sand is capable of producing oil or other hydrocarbons, the reduction in permeability must not be so great as to prevent flow into the well.

Primarily, the present invention is directed to the use of a chemical, such as sodium silicate, which is caused to set in situ in the sand of the formation surrounding the well bore. It has long been proposed, as in the U.S. patent to Mills, No. 1,421,706, to consolidate and seal water-bearing sand in oil wells by the use of sodium silicate and some agent which causes it to set therein. However, insofar as known, all prior attempts at sand consolidation with sodium silicate, where successful at all, have rendered the sand impermeable and thus wholly unsuitable for the purpose of the present invention, which requires retention of permeability sufficient to permit production of oil or other hydrocarbons from or through the consolidated zone.

A further object of the present invention is, therefore, to provide a novel process for setting sodium silicate to consolidate loose sand in the production zone of an oil or gas well, producing a permeable, consolidated zone which is stable against the influences of oil and aqueous systems.

Another object of the present invention is to provide a novel process for consolidating loose sand of an oil well producing zone, the consolidation being effective to permit maximum oil production over the normal life of the well.

It will be seen, therefore, that the invention has various objects and advantages and novel features, as will become more apparent from a consideration of the following detailed description.

This invention comprehends within its scope the discovery that sodium silicate can be used to form a permeable, stable and strong consolidation of incompetent sands by injecting the sodium silicate into the sand-containing zone and causing the sodium silicate to set therein by a particular combination of chemical treatments, namely, initially setting the sodium silicate by injection of an aryl hydroxy compound followed by the injection of an inorganic salt to stabilize the set sodium silicate and increase the compressive strength thereof. This combination and sequence of steps has been found to be essential, apparently due in large part to the fact that sodium silicate solutions set with an aryl hydroxy compound alone are not stable in oil, and that sodium silicate solutions set with an inorganic salt alone are not stable in aqueous systems. However, when the sodium silicate is treated in accordance with the present invention, a set is created which is stable in both oil and in aqueous systems and which has an increased compressive strength.

Consideration should first be given to the type of wells wherein the process of the present invention is suitable.

If the formation of the well is of such a nature that sand is likely to be produced with the hydrocarbon over a considerable period of time, use of the present process should be entertained. It probably should not be used where sand is likely to be produced only temporarily when the well is initially brought in.

The present invention may find application in some water bearing formations, such as wells used for obtaining water for water flooding operation, or in water injection wells when water flooding. It should not be used in obtaining water for human consumption, because of the chemicals used.

In general, the present process will not find application in limestone and dolomitic oil producing formations. When such formations are acidized, a fine residue or "silt" is frequently left which contains some sand particles, but it would be better to wash this material out of the well, before it is put on production, than attempt to consolidate the residue.

However, where fracturing operations like those described in the U.S. patent to Farris Re. 23,733 are performed in the well, using sand as a propping agent, the present process may find application. It may be necessary or desirable to consolidate the propping agent in any formation, whether it be limestone, dolomite, sandstone, or any other.

It should also be emphasized that in carrying out the process of the present invention, care has to be exercised in placing the chemicals in the formation to be treated. If undesirable fluids enter the formation before the proper treating sequence has been completed, the process may fail. It is particularly important, therefore, to properly isolate the formation from fluids, such as salt water, which may be in the well bore and which, if allowed to contact the consolidating solution prematurely or in an uncontrolled manner, could produce an unsatisfactory gel or set, resulting in an impermeable or unstable consolidation.

In the present process, a number of chemicals are pumped into the formation. These must enter each part of the formation in the proper order for the treatment to be a success. This may cause some difficulties where the formation being treated is over four or five feet thick. In such cases it is preferable to use straddle packers for the placement of the chemicals. The process has been successfully performed using straddle packers called modified Halliburton-Yowell tools known to those skilled in the art, and which are of the general type shown in the U.S. patents to Boggs and Yowell, No. 2,244,354 and Verheul et al., No. 2,341,832.

With an arrangement like that of the Verheul patent, the swab cups facing each other may be about a foot apart. The chemicals are pumped into the formation through the openings between these cups as the tool is raised and lowered past perforations in the casing of the well adjacent the formation being treated.

Care should be exercised, particularly, to prevent alternate slugs of consolidating solution and brine to be forced into the formation with the movement of the tool. This might cause a premature set that would leave a very low permeability in the part of the formation where this has occurred.

As indicated above, in accordance with the present invention, a number of steps or successive treatments of a given formation are performed. In some wells, all of the steps will be deemed necessary. In others, certain steps are dispensed with.

In the following detailed specification of the preferred process, all of the steps will be described, but it is to be understood that this is by way of illustration only, and is not to be taken as imposing any limitation on the scope of the invention.

DESCRIPTION OF THE PREFERRED PROCESS

If necessary, the formation is first given a pretreatment as described below. Sodium silicate is then pumped into the formation, displaced with oil and chemicals, and then flash set with an oil solution of an aryl hydroxy compound. The set is then stabilized with a water solution of an inorganic salt.

Typical laboratory and field treatment materials and volumes are as follows, although it will readily be understood by those skilled in the art that the proportions of materials may be varied considerably without departing from the principles of the invention, and it is again emphasized that all of the following steps are not essential to the successful use of the present invention under all conditions:

|        | Laboratory | Field Quantities for 10 to 15 Feet of Formation |
|--------|------------|-------------------------------------------------|
| Step 1 | 20 to 40 cc. preflush, for example "Mud Cleanout Agent." | 10 Bbls. or more preflush. |
| Step 2 | 40 cc. Diesel Oil plus 1% "Hyflo." | 10 Bbls. Diesel Oil plus 5 Gallons "Hyflo." |
| Step 3 | 20 cc. Sodium Silicate. | 5 Bbls. Sodium Silicate. |
| Step 4 | 20 cc. Diesel Oil plus 1% "Hyflo." | 5 Bbls. Diesel Oil plus 2½ Gallons "Hyflo." |
| Step 5 | 30 cc. of a 20% M-P Cresol Solution in Oil. | 7.5 Bbls. of the M-P Cresol Solution. |
|        | Stop pumping for 5 minutes | |
| Step 6 | 80 cc. of a 20% Flake Calcium Chloride Solution in Water. | 20 Bbls. of the 20% Flake Calcium Chloride Solution. |
|        | Shut the well in for 5 to 30 minutes | |

Certain terms are used in the above table, and in the following description, which require definition:

(1) "Mud Cleanout Agent," as used herein, has reference to a blend containing a surfactant and dilute hydrochloric acid and sold under the trade name "MCA" by Halliburton Company.

(2) "Hyflo" is the trade name of a chemical sold by Halliburton Company. It is a synergistic mixture of anionic and nonionic surfactants manufactured by Visco Products Company and described in the U.S. Patent No. 2,946,747 of Kirkpatrick et al.

(3) M-P Cresol is a mixture of meta cresol and para cresol.

The following considerations apply to the several steps tabulated hereinbefore:

*Step 1.*—The pumping or injection of the MCA preflush material into the formation zone to be consolidated is not an essential step in the present invention, but is a desirable pretreatment, especially where highly bentonitic sands are to be treated.

Salt water solutions may be used as a preflush to remove the calcium chloride-zinc chloride solutions that are now being used as completion fluids in some areas. This completion fluid will react with sodium silicate and if used, must be removed before the process of the invention can be carried out effectively.

Other chemicals which might be present, either as occurring in nature in the formation to be treated, or in some other additive in the well, or which might have found its way therein as the result of being used in the drilling fluid, and which must be removed before continuing with the treatment of the present invention are: barium chloride, magnesium chloride, magnesium sulphate, ferrous chloride, aluminum chloride, aluminum sulphate, etc., all of which could cause some trouble. A strong acid that has not been effectively flushed out would also be harmful.

*Step 2.*—As a second pretreatment or alternative preflush, the oil-Hyflo mixture is next pumped into the formation. It is used to clean the formation of paraffins and asphaltenes, to remove brines and excess water, and to leave the sand particles water wet. A much better set is obtained in the following steps if the sand is water wet, but here again it is to be emphasized that this step is not an essential feature of the present invention and can be omitted if less than optimum results are required, especially where the sand is already in a water wet condition.

*Step 3.*—Sodium silicate is used as the binding or consolidating agent. Following Step 2, or as the initial step in cases where Steps 1 and 2 are not utilized, it is pumped into the formation to be consolidated. The term "Sodium Silicate" is applied to various ratios of $Na_2O$ and $SiO_2$. Several silicate types have been investigated, with $Na_2O:SiO_2$ ratios varying from 1:2.40 to 1:3.85, and good results have been obtained. Preferably, the sodium silicate is used undiluted, but if desired dilution with ten or more parts of water per 100 parts of sodium silicate can be used to lower the viscosity of the sodium silicate, although with some sacrifice in ultimate compressive strength of the consolidated sand. A tubing plug may be used to wipe the sodium silicate from the tubing sides during this step. One gallon of sodium silicate will consolidate slightly more than 1 cubic foot of sand.

*Step 4.*—The next step consists in flushing the formation. Hyflo-oil flush is used to displace extra sodium silicate from the interstices of the formation, with the objective of leaving an envelope or film of sodium silicate around each sand grain to thus provide a large surface area for contact with the setting chemicals which follow. Again, this step is not essential, but is considered of great importance in developing maximum permeability retention of the resulting consolidation. This step is also desirable in preventing the formation of damaging emulsions between the various solutions used for the treatment.

*Step 5.*—During this step a 20% (by volume) M-P cresol solution in diesel oil is pumped into the formation to flash set the sodium silicate in place. A compressive strength of 550 to 675 p.s.i. can be obtained here, but the consolidation is not stable in oil. A slow pumping rate during this step is recommended as a greater compressive strength of the set product is so obtained. The 5 minute waiting time prior to the next step is recommended in order for the chemical reaction to become essentially complete. The M-P cresol solution is preferred, but other aryl and alkyl aryl hydroxy compounds can be used, such as for example the three cresol isomers; phenol; substituted phenols such as p-chlorophenol, p-aminophenol; dihydroxy benzenes; hydroxy naphthalenes, and the like. Preferably, the aryl group has 1–2 aromatic rings and the alkyl groups have from 1–10 carbon atoms. Compounds which are not adequately oil-soluble, such as commercially available phenols, can be dissolved in an alcohol-water mixture for use in the process. Mixtures of the above compounds are also within the scope of this invention.

The amount of aryl hydroxy compound used should be sufficient to set the sodium silicate. Theoretically, 16.8% by volume of M-P cresol, based upon the volume of the sodium silicate, is required to completely set the sodium silicate. Less than this amount could be used with some degree of success, but it is preferred to use an excess of the cresol to assure complete setting, the preferred amount being 30%, as is apparent from the examples herein. Greater amounts could be used, but without added advantage under usual conditions. Generally speaking, therefore, practical limits for the aryl hydroxy compound are from about 15% to at least about 30% by volume, based upon the volume of the sodium silicate used. The concentration of the aryl hydroxy compound in the oil solution can vary within wide limits, i.e., between about 5% and about 50%, preferably between 10% and 30%, these percentages being by volume, based upon the total volume of the solution.

*Step 6.*—The stabilizing solution is then pumped into the formation. In the typical case, a 20% calcium chloride solution is used. Also comprehended within the scope of this invention are the magnesium, barium, sodium, zinc and iron chlorides, as well as mixtures thereof and of calcium chloride. The stabilizing solution can be preceded by a tubing plug to prevent mixing with the cresol solution. It should be pumped slowly into the formation so that a maximum strength of the set product is obtained. Final displacement is with oil or a brine.

The amount of the inorganic salt used as the stabilizing agent should be sufficient to stabilize the set sodium silicate against substantial deterioration by the action of well fluids such as oil, preferably sufficient to increase the compressive strength of the set sodium silicate. As little as 20% of the salt ($CaCl_2 \cdot 2H_2O$ in 20% aqueous solution) by weight, based on the weight of the sodium silicate, has been found in the laboratory to approximately double the compressive strength of the sodium silicate as set with the M-P cresol. Good results are obtained with between about 10% and about 100% of the salt by weight, based upon the weight of the sodium silicate, 10 to 50% being the preferred range. The concentration of the salt in solution can vary between about 5% and about 40% by weight, based on the weight of the total solution, with the range 10% to 30% being preferred.

It is important, of course, to maintain chemicals which react with the sodium silicate solution properly separated from that solution until the time comes for the desired reaction. To some extent, this can be maintained by the use of plugs, such as mentioned above, like those commonly used in cementing oil wells. In this connection, it will be observed that in performing Steps 1 and 2, described above, the washing liquids serve as a buffer, both in the tubing and in the formation, to shield the sodium silicate solution injected during Step 3, by removing or pushing ahead the interstitial water which may contain a water soluble salt capable of setting the solution.

PROPERTIES OF THE CONSOLIDATION

In the laboratory, compressive strength of the consolidation obtained with the process of this invention has varied between 1150 p.s.i. to around 1600 p.s.i., depending upon the flow rates of the setting solutions and the temperature of the set. Greater compressive strengths are obtained at the higher temperatures (120° F. versus 180° F.).

The set product is stable in oil and aqueous systems such as salt solutions and brines containing various amounts of calcium and magnesium. In aging tests in the last mentioned brines, slight increases of compressive strength were observed.

The strength of the consolidation decreases rapidly when contacted with hydrochloric acid. Also, hydrofluoric acid will destroy the consolidation. The consolidated sand is stable in dilute (1.5%) sodium hydroxide.

The permeability retention of consolidated clean formation sands is quite good. Air permeabilities in the laboratory have varied between 2 to 10 darcys. Where up to 5% bentonite was mixed with a clean sand, the resulting permeability was 400 to 500 millidarcys. Better permeabilities can probably be obtained in sands which contain around 5% bentonite by diluting the sodium silicate in the ratio of 100 cc. silicate to 10 cc. to 35 cc. water.

Maximum permeability retention is believed to be obtained for two reasons: First, the flushing with oil and Hyflo in Step 4, described above, removes interstitial sodium silicate, leaving only a film of sodium silicate retained on each sand grain or particle where the sand grains are touching each other or agglomerated. Thus some pore space is left between the sand grains and/or particles. Secondly, when the cresol reacts with the placed sodium silicate, some free water is released. This tends to create pore spaces and permeability by causing the films on the sand grains to shrink, and again, this is particularly true where the sand grains are touching.

While the above explanation of permeability retentivity is somewhat theoretical, it seems to be confirmed by microscopic study in the laboratory, but of course applicant is not bound by this theory.

Where it is necessary to re-treat the formation, it is recommended that the sodium silicate be diluted in the ratio of 100 cc. silicate to 10 cc. or 35 cc. water. This is a compromise concentration of silicate to retain as much permeability of the formation as possible where treated twice, and to still give adequate strength (around 700 p.s.i.) for the part of the formation that was missed by the first treatment and contacted only by the second stage.

ADVANTAGES OF THIS CONSOLIDATING SYSTEM OVER MOST RESIN SYSTEMS (A) The cost of setting materials (oil not included) is ⅓ to ½ the resin cost. The volume of oil used for both systems is about the same.

(B) The set product is 2 to 4 times stronger than most alkaline type resin sets.

(C) In general, it is thought that greater strengths of the sets may decrease with the number of stages required to obtain complete sand control. Resin has required from one to five stages.

(D) The new process retains more permeability than most resin systems.

(E) Shut in time is 5 to 30 minutes after the completion of the treatment as compared to 12 to 24 hours for resin.

(F) The same basic formula can be used for all temperature conditions.

(G) The material does not set in the tubing or formation before it is displaced.

(H) All chemicals are easily available and require no special storage.

The following specific examples are illustrative of the process of the present invention as applied to actual field uses, but it is to be understood that the invention is not to be limited to the specific details thereof:

*Example No. 1*

In the High Island, Texas field, from March 15 to 18, 1960, a well was treated with the process of this invention.

All chemicals were premixed at the field camp and transported to the field in several tank compartments.

An acid truck (2 compartments), trailer tanks (2 compartments), and a small tank truck were necessary.

The well had casing and tubing therein, the casing being perforated at the formation which was to be treated.

A modified Yowell tool was used to promote uniform distribution of the materials throughout different permeability areas within the producing interval. The tool made two complete trips across the interval while the consolidating solution was forced into the formation. The tool was designed to isolate smaller perforation areas and concentrate fluid treatment momentarily in areas comprised by possibly as few as one to two perforations in the casing of the well. The tool was used with salt water in the annulus. Although isolation from the annulus space by the tool is theorized there does exist a remote possibility of some contamination of the consolidating solution with the salt water in the annulus. If this protection from the annulus space should fail, the sodium silicate would set up in the hole if salt water is used in the annulus; i.e., in a Braden Head squeeze manner.

The procedure and data on this job was as follows:

TABLE 1.—FLUID INJECTION DATA (SURFACE)

| Step | Fluid Pumped | Average Pump Rate |
|---|---|---|
| 1. Preflush | 10 bbls. diesel, 5 gals. Hyflo. | 1.65 bbls./min. |
| 2. Consolidating solution | 5½ bbls. sodium silicate (Na$_2$O:SiO$_2$ ratio of 1:3.22), 10 gals. H$_2$O. | 1.83 bbls./min. |
| 3. Afterflush solution | 6 bbls. diesel oil, 3 gals Hyflo. | 1 bbl./min. |
| 4. Setting solution [1] | 7½ bbls. diesel oil (including 65 gals. cresol). | 1.33 bbls./min. |
| 5. Stabilizing solution | 20 bbls. CaCl$_2$ | 1.33 bbls./min. |
| 6. Displacement fluid | 14½ bbls. salt H$_2$O | 1.45 bbls./min. |

[1] Well was shut down 5 minutes when all the setting solution had entered the formation.

TABLE 2.—FLUID INJECTION DATA[1] (FORMATION)

| Accumulative Displacement | Fluid Entering Formation |
|---|---|
| 14½ barrels | Preflush. |
| 24½ barrels | Consolidating. |
| 30 barrels | Afterflush. |
| 36 barrels | Setting. |
| 43½ barrels | Stabilizing. |
| 63½ barrels—Total fluid for treatment | Displacement on bottom. |

[1] Tubing capacity = 14½ barrels.

CONCLUSIONS (1) Mechanically, the job was very successful. It took only about 50 minutes for treatment of a seven foot interval.

(2) Immediately after the job was complete the hole was reverse circulated out with salt water. Very few fines were produced with this fluid at the surface.

(3) A report was received on the well March 24, 1960. After 18 hours of pumping, the well's production was 90 barrels fluid per day with 25% salt water. The well produced 152 barrels fluid per day with 2% water after a 24 hour pumping period with no sand.

*Example No. 2*

A well was treated in the West Cameron Block 40, south of Cameron, Louisiana on February 23, 1960.

Capacity of 2½ inch tubing in the well was 38 barrels with perforations in the casing being at 6948–52 feet and 6960–70 feet. The tubing was packed off in the casing with packers set above the top perforations and below the bottom set of perforations. The 2.5 inch tubing was mechanically perforated with two ¼ inch holes opposite each set of perforations.

The chemicals were mixed on location since the well was offshore. The tubing was filled with oil at the start of the job.

Thirteen barrels of diesel oil plus 7 gallons Hyflo were pumped into the formation. The first 5 barrels were pumped at 1200 to 1600 p.s.i. at 1 barrel per minute, the next 5 barrels at 2000 to 2600 p.s.i. at 2 barrels per minute and the last 3 barrels at 2800 p.s.i. at 1.5 barrels per minute. This is supposed to be a gas well but the formation appeared to be filling up quite rapidly. The total pressure on the formation at this time was 5300 p.s.i.

Consolidating solution. This was composed of 270 gallons (5 drums) sodium silicate (Na$_2$O:SiO$_2$ ratio of 1:3.22) plus 30 gallons of water which makes a total 7 barrels of solution.

Since no formation sample was available for evaluation, the sodium silicate was diluted in order to retain maximum permeability if the formation contained water swelling clays. This solution was pumped at an average rate of 1.5 barrels per minute and a final pump pressure of 2700 p.s.i. and a total pressure of 5500 p.s.i. on the formation. The afterflush was composed of 10 barrels diesel oil and 5 gallons Hyflo which was pumped at the rate of 1.25 barrels a minute at 3000 p.s.i. pump pressure.

The setting solution was composed of 63 gallons M–P cresol and enough diesel oil to make 10 barrels of solution. After 8 barrels of this solution had been pumped (a total of 38 barrels so far), the first Hyflo treated oil was starting to enter the formation. The injection rate was 0.83 barrels per minute, the final pump pressure 3500 p.s.i. and total pressure on the formation was 6390 p.s.i.

The stabilizing solution was prepared by mixing 1440 pounds of anhydrous calcium chloride and enough water to make 24 barrels of solution. This solution was pumped into the formation with the pump pressure gradually increasing from 3500 p.s.i. to 3800 p.s.i. At this point, 12 barrels of solution had been pumped into the tubing and 4 barrels of the consolidating solution had been pumped into the formation. A total pressure of 6912 p.s.i. was on the formation. Two small breaks in pressure were then noted with a total decrease in pressure of 200 p.s.i. being observed. The pump rate was slowed a little and the pressure dropped to 3100 p.s.i. This rate was continued for the remaining 12 barrels of stabilizing solution. Final pump pressure was 3200 p.s.i. and the average pumping rate for the 24 barrels of solution was 0.38 barrels per minute.

Diesel oil was used to displace all of the solutions into the formation. The first 10 barrels were pumped at the rate of 0.323 barrels per minute at a pump pressure of 3400 p.s.i. or a total pressure of 6570 p.s.i. on the formation. The next 20 barrels of oil were pumped at a rate of 0.232 barrels per minute, at a pump pressure of 3900 p.s.i., and a total pressure of 6790 p.s.i. on the formation. The final 8 barrels of oil were pumped at the rate of 0.145 barrels per minute with a final pump pressure of 4000 p.s.i. and a pressure of 6500 p.s.i. being on the formation.

This treatment successfully controlled the production of sand.

*Example No. 3*

Another well in the High Island Field, Texas, was treated with the process of the invention on March 21, 1960.

This well was equipped with a wire-wrapped screen and the work was performed to see if the process could be performed by injecting the chemicals into the formation through this screen. The process was successfully performed by using a tool similar to a Yowell perforation washing tool which, by reciprocating throughout the length of the screen portion, injected the treating fluids into the formation through the screen along its entire length.

The data on this example is as follows:

RESULTS

Production after treatment:

| Days After Treatment | Production | Remarks |
|---|---|---|
| 1 | 220 b.w.p.d. | Small amount of fine silty sand. |
| 2 | 220 b.w.p.d. | No sand. |
| 7 | 160 b.w.p.d., 40 b.o.p.d. | Do. |
| 14 | 70 b.w.p.d., 106 b.o.p.d. | Do. |

WELL DATA

Casing _____ 7 inches.
Tubing _____ 2½ inches.
Tubing volume _____ 22 barrels.
Formation _____ Pliocene.
Screen: Stancliff, .008″ gauge, 302 stainless steel, wire-wrapped 122 square inches effective inlet area (9.4 square inches per foot) section, 13 feet. Blank section—30 feet. 5″ O.D., 4.28″ I.D. Bottom of liner at 3854½ feet.
Perforated Interval—3843–3853 feet.
Previous Production: 100 b.o.p.d., 521 GOR before water production.
Previous Sand Control Measures and Results: Above described screen in hole. Sanded up and bailed twice as of February 22, 1960. Sand found about 50 feet up the hole. About 2.3 barrels sand bailed from well each time.
(In the above data, "b.w.p.d." means Barrels of Water per day; "b.o.p.d." means Barrels of Oil per day; "GOR" means Gas-Oil-Ratio.)

MATERIALS USED (1) Preflush solution—10 barrels diesel oil plus 5 gallons of Hyflo.
(2) Consolidating solution—216 gallons, diluted with 22 gallons of water.
(3) Afterflush solution—8 barrels diesel oil plus 5 gallons Hyflo.
(4) Setting solution—7½ barrels.
(5) Stabilizing solution—20 barrels.

Having fully described my invention, it is to be understood that I do not wish to be limited to the details set forth but my invention is of the full scope of the appended claims.

I claim:

1. A process for consolidating sand in a fluid-producing earthen formation while retaining permeability thereof comprising the steps of injecting sodium silicate into the formation, then injecting into the formation a material selected from the group consisting of aryl and alkyl aryl hydroxy compounds and mixtures thereof, said material being injected in sufficient amount to set the sodium silicate, and then injecting into the formation an aqueous solution of an inorganic chloride having a cation selected from the group consisting of calcium, magnesium, barium, sodium, zinc, iron and mixtures thereof, the amount of said aqueous solution being sufficient to stabilize the sodium silicate against the action of oil, whereby a consolidated permeable formation is produced.

2. The process of claim 1, wherein said material comprises a cresol.

3. The process of claim 1, wherein said material comprises phenol.

4. The process of claim 1, wherein said material comprises an oil solution of a cresol.

5. The process of claim 1, wherein said material comprises an oil solution of a mixture of meta and para cresols, and said cation is calcium.

6. A process for consolidating sand in a fluid-producing earthen formation while retaining permeability thereof comprising the steps of injecting sodium silicate into the formation, then injecting into the formation from about 15% to at least about 30% by volume, based upon the volume of said sodium silicate, of a material selected from the group consisting of aryl and alkyl aryl hydroxy compounds and mixtures thereof, said material being injected to set the sodium silicate, and then injecting into the formation an aqueous solution of an inorganic chloride having a cation selected from the group consisting of calcium, magnesium, barium, sodium, zinc, iron and mixtures thereof, the amount of said aqueous solution being sufficient to provide between about 10% and about 100% of the inorganic chloride by weight, based upon the weight of said sodium silicate whereby a consolidated permeable formation is produced.

7. The process of claim 6, wherein said material comprises a cresol.

8. The process of claim 6, wherein said material comprises phenol.

9. The process of claim 6, wherein said material comprises an oil solution containing between about 5% and 50% by weight of a cresol.

10. The process of claim 6, wherein said material comprises an oil solution of a mixture of meta and para cresols having a concentration of cresols between 10% and 30% by weight, and wherein said inorganic chloride is calcium chloride, the concentration of the aqueous solution thereof being between about 5% and about 40% by weight and the amount of calcium chloride being between about 10% and about 50% by weight, based upon the weight of said sodium silicate.

11. A process for consolidating sand in a fluid-producing earthen formation while retaining permeability thereof comprising the steps of injecting sodium silicate into the formation, then displacing a portion of the sodium silicate from the interstices of said formation, then injecting into the formation a solution of a compound selected from the group consisting of aryl and alkyl aryl hydroxy compounds and mixtures thereof, said compound being injected in sufficient amount to set the sodium silicate, and then injecting into the formation an aqueous solution of an inorganic chloride having a cation selected from the group consisting of calcium, magnesium, barium, sodium, zinc, iron and mixtures thereof to stabilize the sodium silicate against the action of oil whereby a consolidated permeable formation is produced.

12. A process for consolidating sand in a fluid-producing earthen formation while retaining permeability thereof comprising the following steps in the order set forth: (a) injecting oil containing a surfactant into the formation to clean the formation and leave the sand in a water wet condition; (b) injecting sodium silicate into the formation; (c) displacing a portion of the sodium silicate from the interstices of the formation; (d) injecting into the formation a solution of a material selected from the group consisting of aryl and alkyl aryl hydroxy compounds and mixtures thereof, said solution being injected in sufficient amount to set the remaining sodium silicate; and (e) injecting into the formation an aqueous solution of an inorganic chloride having a cation selected from the group consisting of calcium, magnesium, barium, sodium, zinc, iron and mixtures thereof, said aqueous solution being in sufficient amount to stabilize the sodium silicate against the action of oil whereby a consolidated permeable formation is produced.

13. The process of claim 12 wherein step (c) is carried out by injection of oil containing a surfactant.

14. The process of claim 12 wherein said material is a cresol and said cation is calcium.

15. The process of claim 12 wherein the step of injecting oil is preceded by a step which comprises pretreating the formation with a mud cleanout agent containing an acid.

16. A process for consolidating sand in a fluid-producing earthen formation while retaining permeability thereof comprising the following steps in the order set forth:

(a) injecting oil containing a surfactant into the formation to clean the formation and leave the sand in a water wet condition; (b) injecting sodium silicate into the formation; (c) displacing a portion of the sodium silicate from the interstices of the formation; (d) injecting into the formation a solution of a material selected from the group consisting of aryl and alkyl aryl hydroxy compounds and mixtures thereof, the aryl groups having 1-2 aromatic rings and the alkyl groups having from 1-10 carbon atoms, said solution being injected in sufficient amount to set the remaining sodium silicate; and (e) injecting into the formation an aqueous solution of an inorganic chloride having a cation selected from the group consisting of calcium, magnesium, barium, sodium, zinc, iron and mixtures thereof, said aqueous solution being in sufficient amount to stabilize the sodium silicate against the action of oil whereby a consolidated permeable formation is produced.

References Cited by the Examiner

UNITED STATES PATENTS

| | | | |
|---|---|---|---|
| 2,024,119 | 12/35 | Vietti et al. | 166—32 |
| 2,025,948 | 12/35 | Jorgensen | 166—29 X |
| 2,207,759 | 7/40 | Reimers | 166—29 |
| 2,302,913 | 11/42 | Reimers | 166—29 X |
| 2,378,817 | 6/45 | Wrightsman et al. | 166—33 |
| 2,604,172 | 7/52 | Wrightsman | 166—33 |
| 2,927,639 | 3/60 | Schuessler et al. | 166—42 |
| 2,946,747 | 7/60 | Kirkpatrick et al. | 166—42 X |
| 3,097,694 | 7/63 | Kerver | 166—29 X |

OTHER REFERENCES

Mellor, G.W.: Comprehensive Treatise on Inorganic and Theoretical Chemistry, N.Y., Longmans, Green & Co., 1947, vol. VI, page 324, QD 31. M4 v. 6.

CHARLES E. O'CONNELL, *Primary Examiner.*